UNITED STATES PATENT OFFICE.

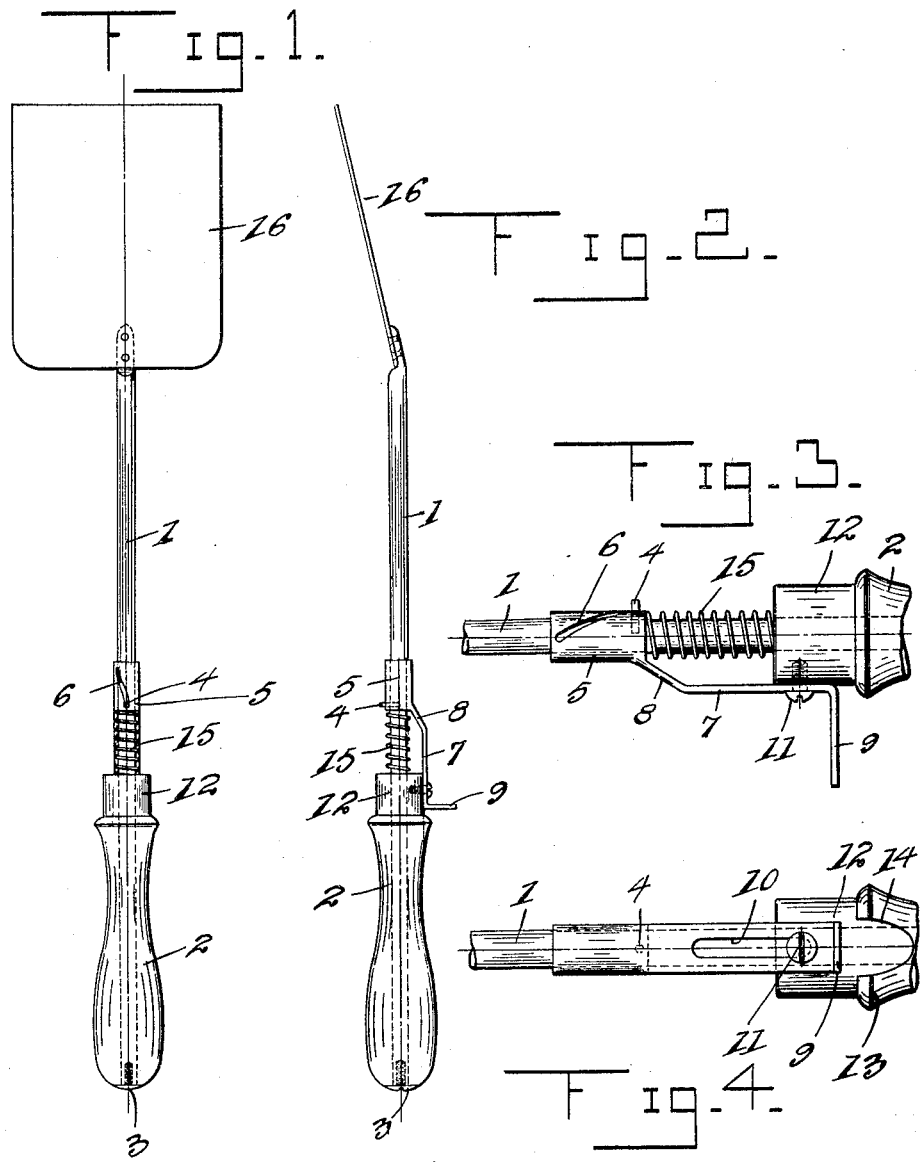

ERWIN S. FREY, OF BROOKLYN, AND FRANK MARRIOTT, OF WOODHAVEN, NEW YORK.

CAKE-TURNER.

1,109,523.   Specification of Letters Patent.   Patented Sept. 1, 1914.

Application filed October 21, 1913. Serial No. 796,510.

*To all whom it may concern:*

Be it known that we, ERWIN S. FREY and FRANK MARRIOTT, citizens of the United States, residing at Brooklyn and Woodhaven, respectively, in the counties of Kings and Queens, respectively, and State of New York, have invented certain new and useful Improvements in Cake-Turners; and we do hereby declare the following to be a full, clear, and exact description of the invention, such as will enable others skilled in the art to which it appertains to make and use the same.

This invention relates to cake turners, designed for the purpose of turning gridle cakes without turning the handle of the cake turner, and one of the principal objects of the invention is to provide a device of simple construction, which will turn griddle cakes quickly and place them on the griddle at exactly the same place from which they were lifted by the cake turner without the tedious twisting of the wrist of the user.

Persons who are required to bake a great many griddle cakes find it very tedious to twist the wrist in turning the cakes and in the course of a day this operation may lead to serious difficulties in the way of painful wrists and swollen joints.

It is one of the purposes of this invention to provide simple means to prevent the difficulty referred to.

The objects and advantages above referred to may be attained by means of the construction illustrated in the accompaning drawings, in which, Figure 1 is a front elevation of a cake turner made in accordance with this invention. Fig. 2 is an edge view of the same. Fig. 3 is an enlarged detail view in side elevation of the spring and sliding sleeve for turning the shank of the cake turner, a portion of the shank and handle being broken away, and Fig. 4 is a similar view taken at right angles to that shown in Fig. 3.

Referring to the drawings the numeral 1 designates the shank of the cake turner made round in cross section and 2 is the handle through which the shank extends. A screw 3 holds the shank and handle in place, said handle being permitted to rotate upon the shank.

A pin or stud 4 projects outward from the shank 1 and a sliding sleeve 5 surrounds the shank 1 and is provided with a curved or spiral slot 6, through which the pin 4 projects. Connected to the sleeve 5 is an arm 7 which is bent away from the sleeve as at 8, and provided with an angular finger hold 9. The arm 7 is provided with an elongated slot 10 and a screw 11 is passed through the slot 10 and secured to the handle 2 at the reduced end, said screw being loosely connected so that the arm 7 will slide on the reduced portion 12 of the handle. The sleeve 13 on the handle is cut away as at 14, to permit the arm to slide backward against the tension of the spring 15 which bears at one end against the handle and at the other end against the sleeve 5. A flat blade 16 is secured to the outer end of the shank 1 at a slight inclination from the plane of said shank.

The operation of the cake turner may be briefly described as follows: The blade 16 is inserted underneath the griddle cake and by pulling backward upon the finger hold 9 the stud 4 will ride in the curved or spiral slot 6 of the sleeve 5 and partially rotate the shank 1 to turn the cake ready for depositing it upon the griddle.

The invention is simple in construction may be manufactured at low cost and is efficient for its purpose.

What is claimed is:—

The hereindescribed cake turner comprising a shank, a flat turning blade connected to one end of said shank and inclined therefrom, a handle mounted on the other end of said shank, a sleeve mounted to slide on said shank and provided with a spiral slot, a pin projecting from said shank through said spiral slot, a spring bearing at one end against said handle and at its opposite end against said sleeve, an arm connected to said sleeve, said arm being bent away from said sleeve and extending over a portion of said handle, said arm being provided with an angular finger hold projecting away from the handle member, said arm having slot therein and a screw for holding said arm slidably connected to said handle.

In testimony whereof we affix our signatures in presence of two witnesses.

ERWIN S. FREY.
FRANK MARRIOTT.

Witnesses:
FRANCIS W. SMITH,
CHARLES T. CONWAY.